(12) United States Patent
Teramoto

(10) Patent No.: US 12,173,131 B2
(45) Date of Patent: Dec. 24, 2024

(54) MEMBER INCLUDING LAMINATE AND METHOD OF PRODUCING MEMBER INCLUDING LAMINATE

(71) Applicant: CANON KABUSHIKI KAISHA, Tokyo (JP)

(72) Inventor: Yoji Teramoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/051,574

(22) Filed: Nov. 1, 2022

(65) Prior Publication Data

US 2023/0143353 A1 May 11, 2023

(30) Foreign Application Priority Data

Nov. 10, 2021 (JP) .................... 2021-183731

(51) Int. Cl.
| | | |
|---|---|---|
| *C08J 7/04* | (2020.01) | |
| *B05D 7/00* | (2006.01) | |
| *B32B 19/04* | (2006.01) | |
| *C09D 1/00* | (2006.01) | |
| *C09D 7/61* | (2018.01) | |
| *C09D 201/00* | (2006.01) | |

(52) U.S. Cl.
CPC ............ *C08J 7/0423* (2020.01); *B05D 7/536* (2013.01); *B32B 19/045* (2013.01); *C09D 1/00* (2013.01); *C09D 7/61* (2018.01); *C09D 201/00* (2013.01)

(58) Field of Classification Search
CPC . C08J 7/0423; C09D 1/00; C09D 7/61; C09D 201/00; B05D 7/536
USPC ......................................................... 428/688
See application file for complete search history.

(56) References Cited

U.S. PATENT DOCUMENTS

2019/0295391 A1* 9/2019 Watanabe .............. G03B 17/08

FOREIGN PATENT DOCUMENTS

| JP | 2015-66796 A | 4/2015 |
|---|---|---|
| JP | 2018-040940 A | 3/2018 |

* cited by examiner

*Primary Examiner* — Vu A Nguyen
(74) *Attorney, Agent, or Firm* — VENABLE LLP

(57) ABSTRACT

Provided is a member in which the strength of a second layer located on the outermost surface of the exterior is improved in order to sufficiently exhibit and maintain the functions, to thereby improve impact resistance and scratch resistance. The member is a member including a base material, a first layer, a second layer, and a third layer in the stated order, wherein the first layer is an inorganic porous layer in which a plurality of inorganic particles are joined to each other, and the first layer and the second layer have a total thickness of 0.3 μm or more and 2 μm or less, wherein the third layer contains a resin and has a thickness of 0.4 μm or more and 2,000 μm or less, and wherein the second layer contains the inorganic particles and the resin.

18 Claims, 1 Drawing Sheet

MEMBER INCLUDING LAMINATE AND METHOD OF PRODUCING MEMBER INCLUDING LAMINATE

BACKGROUND OF THE INVENTION

Field of the Invention

The present invention relates to a member excellent in impact resistance and scratch resistance and a method of producing the member.

Description of the Related Art

In members to be used in products that are used outdoors, such as on-vehicle parts, smartphones, and drones, and products that are used indoors, such as notebook computers and home electric appliances, members to be used in printing paper, leather belts, or bags, and the like, a decorative layer, a hard coat, or the like is formed on a base material to improve aesthetic appearance and strength. In Japanese Patent Application Laid-Open No. 2015-66796, an appropriate primer layer is used between a base material and a decorative layer to improve adhesiveness and suppress falling-off of the decorative layer from the base material.

A member to be used for an exterior has functions, such as an antifouling property, hydrophilicity, an antibacterial property, an antiviral property, or decoration, depending on the usage environments. In order to sufficiently exhibit and maintain the functions, it is important to improve the impact resistance and scratch resistance of a layer (surface layer) located on an outermost surface of the exterior. The primer layer in Japanese Patent Application Laid-Open No. 2015-66796 contains a resin, and hence the hardness of a film is not sufficient. As a result, the primer layer is deformed by a force applied to the surface layer. Accordingly, the impact resistance and scratch resistance of the surface layer cannot be improved.

SUMMARY OF THE INVENTION

The present invention has been made in view of the above-mentioned background art, and provides a member excellent in impact resistance and scratch resistance by connecting a layer located on the outermost surface and the base material to each other via an inorganic porous layer containing a plurality of inorganic particles joined to each other and a method of producing the member.

A member according to the present invention is a member including a base material, a first layer, a second layer, and a third layer in the stated order, wherein the first layer is an inorganic porous layer in which a plurality of inorganic particles are joined to each other, wherein the third layer is a layer containing a resin, wherein the second layer is a layer containing the plurality of inorganic particles and the resin, wherein the first layer and the second layer have a total thickness of 0.3 μm or more and 2 μm or less, and wherein the third layer has a thickness of 0.4 μm or more and 2,000 μm or less.

Further features of the present invention will become apparent from the following description of exemplary embodiments with reference to the attached drawings.

DESCRIPTION OF THE EMBODIMENTS

An embodiment of the present invention is described below with reference to the drawings. In the following description and the drawings, a component common to a plurality of drawings is denoted by a common symbol. Further, the common component may be described with cross-reference to a plurality of drawings without notice. In addition, the description of the component denoted by the common symbol may be omitted.

<Member 1>

Figure 1A:
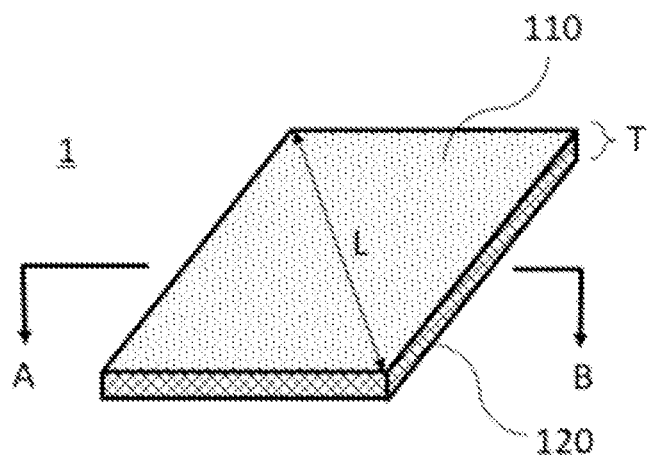
FIG. 1A is a perspective view for illustrating an example of a member 1.

FIG. 1A is a perspective view of an example of a member 1 according to an embodiment of the present invention. The member 1 has a shape in accordance with the application thereof, such as a film shape, a sheet shape, a plate shape, a dome shape, or a spherical shape. When the member 1 has a film shape, the member 1 may be referred to as "film". When the member 1 has a sheet shape, the member 1 may be referred to as "sheet". When the member 1 has a plate shape, the member 1 may be referred to as "plate". The member 1 has a front surface 110 and a back surface 120, and the front surface 110 and the back surface 120 have substantially the same shape. The distance between the front surface 110 and the back surface 120, that is, a thickness T of the member 1 is smaller than a maximum width L of the front surface 110 and the back surface 120, and may be, for example, less than 1/100 of the maximum width L. The front surface 110 and back surface 120 of the member 1 of this example are each a quadrilateral, but are not limited thereto.

In addition, when the member 1 has a dome shape or a spherical shape, the member 1 may have a hemispherical shape or a shape close to a spherical shape. The detailed shape depends on the use application, but it is required that the thickness T of a base material be set so that the dome shape or the spherical shape can be held.

Figure 1B:
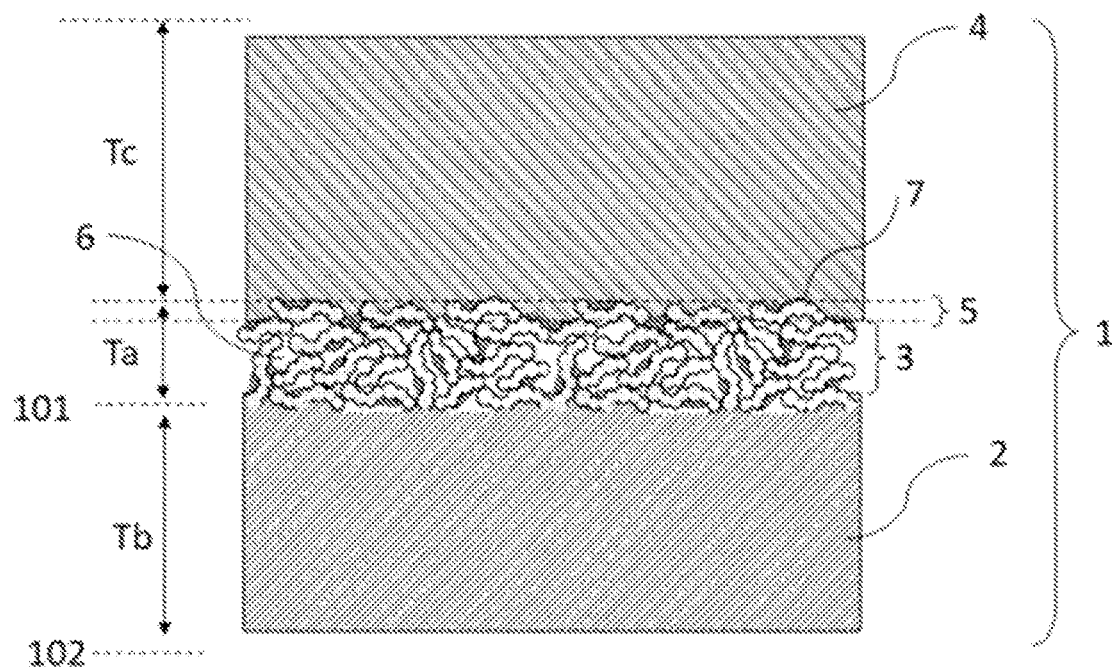
FIG. 1B is a sectional view of the member 1 taken along the line A-B illustrated in FIG. 1A.

FIG. 1B is a sectional view of the member 1 taken along the line A-B illustrated in FIG. 1A.

The member 1 is a laminate formed of at least three layers, and includes a base material 2, a first layer 3 containing particles arranged on the base material 2, a third layer 4 arranged above the first layer 3, and a second layer 5 formed between the first layer 3 and the third layer 4. The second layer 5 can bond the third layer 4 to the first layer 3. In addition, the first layer 3 is an inorganic porous layer. Because of this, the impact applied to the third layer 4 is absorbed, and the degree of deformation caused by the impact is small, with the result that the impact resistance and scratch resistance of the third layer 4 can be improved.

<Base Material 2>

The base material 2 is not particularly limited as long as the base material 2 is excellent in processability and enables a layer to be formed on the surface thereof. The base material 2 has two principal surfaces 101 and 102 opposed to each other. The distance between the principal surface 101 and the principal surface 102 is a thickness Tb of the base material 2. The thickness Tb of the base material 2 may be 1 μm or more and less than 100 mm. When the thickness Tb of the base material 2 is less than 250 μm, and the member 1 has flexibility, it can be said that the member 1 has a film shape. When the thickness Tb of the base material 2 is 250 μm or more, and the member 1 has flexibility, it can be said that the member 1 has a sheet shape. When the member 1 does not have flexibility, it can be said that the member 1 has a plate shape.

The first layer 3 is formed on the principal surface 101 of the base material 2, and the second layer 5 and the third layer 4 are formed on the first layer 3 in the stated order. As required, the first layer 3, the second layer 5, and the third layer 4 may be formed on the principal surface 102 of the base material 2, and the first layer 3, the second layer 5, and the third layer 4 formed on the principal surface 101 may be different from those formed on the principal surface 102, respectively.

The base material 2 is not particularly limited as long as the base material 2 is made of a material that can hold the form of the member 1, such as a resin, glass, a metal, or ceramics.

Specific examples of the resin to be used in the base material 2 include: a polyester resin, such as polyethylene terephthalate (PET) or polybutylene terephthalate (PBT), a polycarbonate (PC) resin, a cellulose triacetate (TAC) resin, a cycloolefin (COP) resin, a polymethyl methacrylate (PMMA) resin, an acrylic polyvinyl alcohol (PVA) resin, a polyacetal (POM) resin, a polyamide resin, a polyphenylene sulfide (PPS) resin, a polyether ether ketone (PEEK) resin, a glass fiber-reinforced polyamide MXD6 (RENY) resin, a polyvinyl chloride (PVC) resin, a polypropylene (PP) resin, an ABS resin, a polyimide (PI) resin, a tetrafluoroethylene (PTFE) resin, a perfluoroalkoxyalkane (PFA) resin, and a vinylidene fluoride (PVDF) resin.

In addition, the resin may contain an organic filler, an inorganic filler, or the like in a raw material, and different resins may be mixed as required.

In addition, inorganic glass containing, for example, zirconium oxide, titanium oxide, tantalum oxide, niobium oxide, hafnium oxide, lanthanum oxide, gadolinium oxide, silicon oxide, calcium oxide, barium oxide, sodium oxide, potassium oxide, boron oxide, or aluminum oxide may be used as the glass. A glass base material formed by grind polishing, mold forming, float forming, or the like may be used as a glass base material.

A metal containing one kind of metal element or an alloy containing two or more kinds of elements may be used as the metal. Examples thereof include carbon steel, alloy steel, cast iron, non-ferrous metals, such as copper, aluminum, and nickel, and alloys thereof, gold, silver, platinum, tin, lead, bismuth, magnesium, titanium, and zinc.

In order to improve, for example, the adhesiveness between the base material 2 and the first layer 3, or the strength and flatness of the first layer, the surface of the base material may be washed or polished. In addition, a fifth layer may be formed between the first layer 3 and the base material 2 in order to improve adhesiveness. As a preferred example of the fifth layer, there is given a layer containing at least one kind selected from the group consisting of: zirconium oxide; titanium oxide; tantalum oxide; niobium oxide; hafnium oxide; silicon oxide; aluminum oxide; and a resin.

An intermediate layer may be a single layer made of the above-mentioned materials or may be a laminate of a plurality of kinds of layers.

<First Layer 3>

The thickness of a region containing inorganic particles on the principal surface 101, that is, the total thickness of the first layer 3 and the second layer 5 is a physical thickness Ta, and the third layer 4 has a physical thickness Tc. The physical thicknesses Ta and Tc are each smaller than the thickness Tb of the base material 2, and Ta is smaller than Tc (Ta<Tc<Tb). Accordingly, the shape and mechanical characteristics of the member 1 are mainly determined by the base material 2.

The physical thickness Ta is 0.3 µm or more and 2 µm or less, preferably 0.5 µm or more and 1.5 µm or less. When the physical thickness Ta is less than 0.3 µm, the hardness of the region containing the inorganic particles is not sufficient, and the scratch resistance is not sufficiently high. When the physical thickness Ta is more than 2 µm, cracks may occur due to the curing shrinkage at the time of formation of the porous layer before formation of the second layer 5. The hardness of the first layer is preferably 1.5 GPa or more. When the hardness of the first layer is less than 1.5 GPa, the impact resistance and scratch resistance of the third layer tend to be low.

The first layer 3 is a porous layer containing a plurality of inorganic particles 7 joined to each other. The inorganic particles 7 (hereinafter sometimes simply referred to as "particles 7") may be joined to each other through an interaction between the particles 7 or may be joined to each other via an inorganic binder. The inorganic binder is preferably a silicon oxide binder, which is a cured product of a silicon oxide compound such as a silicon oxide oligomer obtained by hydrolyzing and condensing a silicate ester.

The first layer 3 contains the particles 7 in an amount of 50 vol % or more. Because of this, the strength of a film is high, and there is no influence of swelling of the film at the time of water absorption or moisture absorption. There is the second layer 5, which is formed when a part of the resin contained in the third layer 4 intrudes into part of pores 6 of the inorganic porous layer formed of the plurality of particles 7 joined to each other, between the first layer 3 and the third layer 4. When the resin contained in the third layer 4 intrudes from the surface of the inorganic porous layer to a depth of 0.1 µm or more, falling-off of the third layer 4 can be suppressed. The thickness of the second layer is preferably 0.1 µm or more and 1 µm or less, more preferably 0.1 µm or more and 0.5 µm or less.

The first layer 3 remains in a state close to the porous layer before formation of the third layer 4 in many cases, and it is preferred that the pores 6 be connected to each other. It is required for the resin contained in the third layer 4 to intrude into the pores, and hence it is preferred that the pores 6 communicate to the film surface before formation of the third layer 4. Whether or not the pores 6 of the porous layer before formation of the third layer 4 have communicated to the film surface may be recognized by observing the state of intrusion of the resin in the cross-section of the second layer 5.

The amount of the pores 6 contained in the first layer 3 may be determined as a pore volume by a nitrogen gas adsorption method. The pore volume is preferably 0.1 cm$^3$/g or more and 0.51 cm$^3$/g or less.

When the pore volume is less than 0.1 cm$^3$/g, most of the pores are lost, and the hardness becomes too high. As a result, the impact resistance of the member is lost and cracks spread.

When the pore volume is 0.1 cm$^3$/g or more, the second layer 5 having a sufficient thickness can be formed, and hence the adhesiveness between the first layer 3 and the third layer 4 is improved. In addition, when the member receives an impact, the pores absorb the impact, to thereby improve the impact resistance. In addition, even when cracks occur in part of the member, the spread of the cracks can be suppressed. When the pore volume is 0.51 cm$^3$/g or less, sufficient strength can be obtained without any reduction in hardness of a skeleton. A more preferred pore volume is 0.34 cm$^3$/g or more and 0.50 cm$^3$/g or less.

In addition, when the pore volume is more than 0.50 cm³/g, the member becomes brittle due to a large number of air gaps, resulting in a decrease in durability.

<Particle 7>

The particles 7 may have any of a true circular shape, an elliptical shape, a disc shape, a rod shape, a needle shape, a chain shape, or a square shape, and two or more kinds of particles may be used as a mixture thereof.

The particles 7 may be solid particles. The particles 7 that are solid particles may be formed of a uniform solid material, or the particles 7 may be formed so as to have a core-shell structure in which a solid core is wrapped with a solid shell.

Alternatively, the particles 7 may be hollow particles. The hollow particles each have a shape in which a hollow portion is wrapped with a solid shell. The shell may contain an inorganic material such as silica, which is silicon oxide described above.

The particles 7 may be chain-shaped particles. That is, the particles 7 that are chain-shaped particles each have a shape in which a plurality of particles are connected to each other. The pore 6 is formed between two chain-shaped particles. The chain-shaped particles maintain chain-shaped or bead-shaped connections thereof even when the chain-shaped particles form a film, and hence the porosity can be increased as compared to the case of using single particles. The number of particles connected in one chain-shaped particle is 2 or more and 10 or less, preferably 3 or more and 6 or less. When the number of connected particles is more than 10, large pores are liable to be generated, resulting in a decrease in abrasion resistance. Regarding the particle diameter of a particle having a short diameter and a long diameter, such as a chain-shaped particle, the short diameter is taken as an average particle diameter.

The particles 7 have an average particle diameter of preferably 10 nm or more and 80 nm or less, more preferably 12 nm or more and 60 nm or less. When the average particle diameter of the solid particles is less than 10 nm, both the pores between the particles and the pores inside the particles become too small, and the resin contained in the third layer cannot intrude into the first layer. As a result, the adhesiveness between the first layer and the third layer is decreased. In addition, when the average particle diameter is more than 80 nm, the size of each of the pores between the particles becomes large, and hence large voids are liable to be generated, with the result that the strength of the film is lowered, and film cracking and the like are liable to occur. The average particle diameter of the particles is an average Feret diameter. The average Feret diameter may be measured by image processing of an image observed with a transmission electron microscope. Commercially available image processing software such as Image-Pro Plus (manufactured by Media Cybernetics, Inc.) may be used as a method for the image processing. In a predetermined image area, contrast adjustment is appropriately performed as required, and the average Feret diameter of the respective particles is measured by particle measurement, thereby being able to calculate and determine an average value.

The particles 7 are particles containing $SiO_2$ as a main component, and Si accounts for preferably 80 atomic % or more, more preferably 90 atomic % or more in elements excluding oxygen. When Si accounts for less than 80 atomic %, the number of silanol (Si—OH) groups on the particle surfaces that react with a binder is reduced, resulting in a decrease in abrasion resistance.

In addition to $SiO_2$, metal oxides, such as $Al_2O_3$, $TiO_2$, $ZnO_2$, and $ZrO_2$, may be used for the particles 7, and organic components, such as alkyl groups and fluoroalkyl groups, may be introduced into the silicon oxide particles or the particle surfaces via Si atoms. It is more preferred to use hydrophilic particles in which silanol (Si—OH) groups remain on the particle surfaces in consideration of the reactivity between the particles or between the particles and the binder. Particles, in which the particle surfaces are modified with organic groups and the like and the proportion of residual silanol groups becomes less than 70%, lose hydrophilicity. In a member using such particles, the film strength is decreased due to decreases in interaction and reactivity between the particles and between the particles and the binder. In the present invention, the interaction and reactivity between the particles 7 contained in the first layer 3 or between the particles 7 and the binder are maintained, and hence the film strength is not decreased.

<Method of Producing Member 1>

The member 1 has a configuration including, on the base material 2, the first layer 3, the third layer 4, and the second layer 5 formed between the first layer 3 and the third layer 4. The member 1 is not limited to the configuration illustrated in FIG. 1B, and may be formed of the base material 2 of FIG. 1B bonded or joined to another substrate. For example, the member 1 may be produced by forming a laminate through use of the base material 2 as a resin film and forming the laminate on another substrate by general insert molding or the like.

The laminate is produced by applying a coating liquid for forming the first layer 3 onto the base material 2 to form a coating film, drying and/or calcining the base material 2 having the coating film formed thereon to form the first layer 3, and then forming the third layer 4.

<Method of Forming First Layer 3>

It is only required that the coating liquid for forming the first layer 3 contain at least inorganic particles and a solvent, and the coating liquid preferably further contains a component serving as a binder.

Examples of a method of applying the coating liquid include bar coating, gravure coating, die coating, spin coating, blade coating, roll coating, slit coating, printing, and dip coating. In particular, when a member having a three-dimensionally complicated shape with a convex surface or a concave surface, such as a dome shape or a spherical shape, and including a thin film is produced, a spray method, spin coating, or the like may be used. In addition, in the case of application of the coating liquid onto a large area of a thin base material, such as a film or a sheet, gravure coating is preferred from the viewpoint of uniformity of a thickness. In particular, in the case of application of the coating liquid onto a roll-shaped long film, roll-to-roll gravure coating is preferred.

In order to form the first layer 3, the coating liquid is applied onto the base material 2 and dried and/or cured. The drying and/or the curing is a process for removing the solvent and depositing the particles 7 while binding the particles 7 to each other without disturbing the alignment, to thereby form a porous layer. The temperature for the drying and/or the curing depends on the heat resistance temperature of the base material 2, but is preferably 20° C. or more and 200° C. or less. The time for the drying and/or the curing may be a period of time that does not influence the base material 2 and enables the organic solvent in the layer to be evaporated, and is preferably 10 minutes or more and 200 hours or less, more preferably 30 minutes or more and 24 hours or less.

In order to obtain a porous layer in which the particles 7 are highly aligned, the state in which the alignment of the particles 7 is satisfactory is preferred. The difference in alignment of the particles 7 varies mainly depending on the state of dispersion of the particles 7 in the coating liquid for forming the second layer and the state of dispersion of the particles 7 at the time of formation of the coating film.

When the particles 7 in the coating liquid are sufficiently dispersed without being influenced by a dispersion medium or a binder, the particles 7 are easily aligned. However, when the particles 7 are dispersed in a slightly aggregated state due to the influences of the dispersion medium and the binder, the alignment deteriorates.

In addition, the flow of the particles 7 caused by the volatilization and drying, and concentration of the solvent when the coating liquid is applied onto the base material 2 to form the coating film also greatly influence the alignment. Even in the case where the state of dispersion of the particles 7 in the coating liquid is satisfactory, when the particles 7 are aggregated at the time of drying for forming the coating film, the alignment of the particles 7 is disturbed, with the result that the gaps between the particles 7 become large when the coating film is formed, and the voids in the surface direction of the base material 2 become large. When the coating film is formed under a state in which the particles 7 are displaced without being aligned and deposited, the stress distribution of the coating film becomes non-uniform, and the strength of the film cannot be sufficiently kept.

Through use of the particles 7 having a surface treatment agent added thereto as described above in the porous layer, the coating film can be formed under a state in which the particles 7 are aligned and deposited without disturbing the alignment thereof.

The surface treatment agent contained in the porous layer may be determined, for example, by elemental analysis of the particles 7 and the porous layer or by separation and quantitative analysis using ion-exclusion chromatography or the like.

<Third Layer 4>

The third layer 4 may include one layer or a plurality of layers. Alternatively, another film or member may be formed via an adhesive layer containing a resin, or printing may be performed with ink or paint containing a resin.

The physical thickness Tc of the third layer 4 is 0.4 μm or more and 2,000 μm or less. When the physical thickness Tc is less than 0.4 μm, Tc tends to be smaller than the indentation depth at the time of a scratch resistance test, and the surface of the third layer 4 may be scraped off. In addition, when the thickness of the third layer is larger, the scratch resistance and the impact resistance become higher. However, when the physical thickness Tc is more than 2,000 μm, peeling may occur at the interface between the base material 2 and the first layer 3 due to the film stress of the third layer 4. The physical thickness Tc is more preferably 0.5 μm or more and 50 μm or less.

When the coating liquid containing a resin is applied onto the surface of the porous layer formed on the base material, the resin intrudes from the surface of the porous layer to form the second layer 5. The second layer 5 improves the adhesiveness between the first layer 3 and the third layer 4.

Examples of the resin to be used in the third layer 4 include a polyester resin, such as polyethylene terephthalate (PET) or polybutylene terephthalate (PBT), a polycarbonate (PC) resin, a cellulose triacetate (TAC) resin, a cycloolefin (COP) resin, a polymethyl methacrylate (PMMA) resin, an acrylic polyvinyl alcohol (PVA) resin, a polyacetal (POM) resin, a polyamide resin, a polyphenylene sulfide (PPS) resin, a polyether ether ketone (PEEK) resin, a glass fiber-reinforced polyamide MXD6 (RENY) resin, a polyvinyl chloride (PVC) resin, a polypropylene (PP) resin, an ABS resin, a polyimide (PI) resin, a tetrafluoroethylene (PTFE) resin, a perfluoroalkoxyalkane (PFA) resin, and a vinylidene fluoride (PVDF) resin.

In addition, a resin used for hard coating is suitable for the third layer 4. For example, an ionizing radiation-curable resin is used, and preferably, an acrylate-based oligomer or prepolymer including an acrylate resin of a polyfunctional compound such as a polyhydric alcohol, an acrylic resin, an alkyd resin, a polyester resin, a polyether resin, an epoxy resin, a urethane resin, a spiroacetal resin, a polybutadiene resin, or a polyolpolyene resin may be used. Those resins may be used alone or as a mixture thereof as required.

In addition, the resin may contain an organic filler, an inorganic filler, or the like in a raw material, and different resins may be mixed as required.

The ionizing radiation-curable resin can be simply cured by being used in combination with a photoinitiator. Examples of the photoinitiator include: a thioxanthone-based photoinitiator, such as 2,4-diethylthioxanthone or 2-chlorothioxanthone; a phosphorus-based photoinitiator, such as bis(2,4,6-trimethylbenzoyl)-phenylphosphine oxide or 2,4,6-trimethylbenzoyl-diphenyl-phosphine oxide; a Michler's ketone-based photoinitiator such as 4,4-bisdiethylaminobenzophenone; and benzil.

As required, a UV absorber, a coloring pigment, an antioxidant, a silane coupling agent, an antistatic agent, and the like may also be used as other additives.

In addition, in order to impart functions, such as an antifouling property, hydrophilicity, an antibacterial property, and an antiviral property, materials each having functionality may be mixed in the resin, or the third layer 4 including a functional layer may be formed.

For example, there are given materials each having an antibacterial action, such as a copper compound and a silver compound. Alternatively, the third layer 4 may be formed by forming a layer containing a resin through coating and then further forming a material having a function thereon. For example, a functional layer 30, such as an antifouling layer or a hydrophilic layer, may be formed on the surface of the hard coat material in order to impart an antifouling property and water repellency. Examples of the antifouling layer include a layer containing a fluoropolymer, a fluorosilane monomolecular layer, and a layer containing titanium oxide particles. A hydrophilic polymer layer is preferred for the hydrophilic layer, and a layer containing a polymer having an amphoteric hydrophilic group, such as a sulfobetaine group, a carbobetaine group, or a phosphorcholine group, is particularly preferred. A film having a low refractive index may be formed in order to impart an antireflection property.

The method of forming the third layer 4 is appropriately selected depending on the constituent materials. For example, the third layer 4 is formed by wet coating or dry coating, or by bonding of a film or another member.

Examples of the wet coating include bar coating, gravure coating, die coating, spin coating, blade coating, roll coating, slit coating, printing, an ink-jet method, and dip coating. In particular, when a member having a three-dimensionally complicated shape with a convex surface or a concave surface, such as a dome shape or a spherical shape, and including a thin film is produced, a spray method, spin coating, an ink-jet method, or the like may be used. In addition, in the case of application of the coating liquid onto a large area of a thin base material, such as a film or a sheet, gravure coating is preferred from the viewpoint of uniformity of a thickness. In particular, in the case of application of the coating liquid onto a roll-shaped long film, roll-to-roll gravure coating is preferred. Alternatively, electrolytic plating, electroless plating, or electroforming coating may be used.

Examples of the dry coating include: resistive heating, high-frequency induction heating, electron beam heating, arc discharge, a vacuum deposition method, such as laser ablation, magnetron sputtering, ion beam sputtering, ion beam deposition, ion beam assist deposition, and ion beam sputtering.

EXAMPLES

Example 1

A member was produced as described below.
<Preparation 1 of Coating Liquid for Forming First Layer 3>

A coating liquid for forming the first layer 3 was prepared by blending components having the following composition. 6.00 g of an IPA dispersion liquid (IPA-ST-UP manufactured by Nissan Chemical Industries, Ltd., average particle diameter: 12 nm, solid content concentration: 15 mass %) of chain-shaped silicon oxide particles was diluted with 22.13 g of 1-ethoxy-2-propanol to prepare a chain-shaped silicon oxide particle coating liquid (solid content concentration: 3.20 mass %).

In another container, a solution of 1.7 g of nitric acid water (concentration: 3.7 mass %) diluted in advance and 2.30 g of ethanol was slowly added to a solution of 4.17 g of ethyl silicate and 2.30 g of ethanol. The mixture was stirred at room temperature for 15 hours, and then 2.00 g of the weighed reaction solution was diluted with 36.33 g of 2-ethyl-1-butanol to prepare silica sol (solid content concentration: 0.6 mass %).

After the dispersion liquid was diluted with ethyl lactate so that the solid content concentration became 3.9 mass %, the silica sol was added to the resultant so that the ratio of the chain-shaped silicon oxide particles to the silica sol component became 100/12. Further, the resultant was mixed and stirred at room temperature for 2 hours to provide a coating liquid containing chain-shaped silicon oxide particles.
<Method of Measuring Pore Volume>

For measurement of a pore volume, a nitrogen adsorption isotherm was measured through use of an automatic vapor adsorption amount measuring device (BELSORP-MAX manufactured by Bel Japan, Inc.), and the pore volume was determined by a BJH method.
<Method of Measuring Thickness>

The thickness of each layer may be measured by image processing of the cross-section of the member 1 observed with an electron microscope. Commercially available image processing software such as Image-Pro Plus (manufactured by Media Cybernetics, Inc.) may be used as a method for the image processing. In a predetermined image area, contrast adjustment is appropriately performed as required, and the average value of the thickness may be calculated and determined.
<Method of Producing Test Piece for Evaluation>

As a test piece for evaluation, a coating liquid was dropped onto a polycarbonate substrate ($\varphi$30 mm, thickness: 2 mm, mirror surfaces on both sides), and a porous layer having a thickness of about 1.1 μm was formed with a spin coater. A coating film of Aronix UV-6524 (manufactured by Toagosei Co., Ltd.) was formed on the porous layer by bar coating and then cured under the irradiation conditions of 1,000 mJ/cm$^2$ with a metal halide lamp. The cross-section of a sample produced in the same manner was observed to find that the thickness of the first layer was 1 μm, the thickness of the second layer was 0.1 μm, and the thickness of the third layer was about 5 μm.

The test piece was evaluated as described below. The conditions of the test piece of Example 1 are shown in Table 1, and the evaluation results thereof are shown in Table 2.
<Evaluation of Impact Resistance of Member>

Weight drop resistance (JIS K 5600-5-3) was used as a test method. A weight of 300 g was dropped from 100 mm above the test piece, and visual evaluation was performed. The evaluation was performed based on the following criteria.

A: No cracks and peeling occur due to the impact of the weight.
B: A slight change is observed and minute cracks occur due to the impact of the weight.
C: Cracks and peeling occur due to the impact of the weight.

In the present invention, when the evaluation was A, it was determined that the impact resistance was excellent. When the evaluation was B, it was determined that the impact resistance was satisfactory. When the evaluation was C, it was determined that the impact resistance was unsatisfactory.
<Evaluation of Scratch Resistance of Member>

After the performance under the conditions of steel wool #0000 and a load of 700 g×100 reciprocations, the appearance was visually evaluated. The evaluation criteria are as described below.

A: Almost no change is observed in appearance.
B: A slight change is observed in appearance, and minute line scratches and the like occur.
C: A significant change is observed in appearance, and line scratches, film peeling, and the like occur.

In the present invention, when the evaluation was A, it was determined that the scratch resistance was excellent. When the evaluation was B, it was determined that the scratch resistance was satisfactory. When the evaluation was C, it was determined that the scratch resistance was unsatisfactory.

The evaluation of the member 1 was performed as described below. The conditions of the member of Example 1 are shown in Table 1, and the evaluation results thereof are shown in Table 2.

Example 2

The member 1 was produced through use of the same base material as that in Example 1. The formation of the porous layer was performed in the same manner as in Example 1, and the rotation number of spin coating was appropriately adjusted so that the thickness became 0.5 μm. After that, a coating liquid containing a resin was applied and cured in the same manner as in Example 1.

The conditions of the member 1 of Example 2 are shown in Table 1, and the evaluation results thereof are shown in Table 2.

Example 3

The member 1 was produced through use of the same base material as that in Example 1. The formation of the porous layer was performed in the same manner as in Example 1, and the rotation number of spin coating was appropriately adjusted so that the thickness became 2.1 μm. After that, a coating liquid containing a resin was applied and cured in the same manner as in Example 1.

The conditions of the member 1 of Example 3 are shown in Table 1, and the evaluation results thereof are shown in Table 2.

Example 4

The member 1 was produced through use of the same base material as that in Example 1. The formation of the porous layer was performed in the same manner as in Example 2. After that, the same coating liquid containing a resin as that in Example 1 was applied under different spin coating conditions so that the thickness of the third layer became 0.5 μm and then cured to form a layer containing the resin.

The conditions of the member 1 of Example 4 are shown in Table 1, and the evaluation results thereof are shown in Table 2.

Example 5

The member 1 was produced in the same manner as in Example 1 except that the spin coating conditions at the time of the application of the coating liquid containing a resin were changed so that the thickness of the third layer became 100 μm.

The conditions of the member 1 of Example 5 are shown in Table 1, and the evaluation results thereof are shown in Table 2.

Example 6

The member 1 was produced through use of the same base material as that in Example 1. A porous layer was formed by appropriately adjusting the rotation number of spin coating so that the thickness became 1.1 μm through use of the same coating liquid and method as those in Example 1. After that, Durazane 2600 (manufactured by Merck Ltd.), which was a polysilazane solution, was adjusted to 1.2 wt %. The porous layer was overcoated with the polysilazane solution by spin coating so that the solution permeated the particles, to thereby adjust the pore volume of the porous layer to 0.1 cm$^3$/g. After that, the same coating liquid containing a resin as that in Example 1 was applied under different spin coating conditions and cured to form a layer containing the resin. The cross-section of a sample produced in the same manner was observed to find that the thickness of the first layer was 1 μm, the thickness of the second layer was 0.2 μm, and the thickness of the third layer was about 5 μm.

The conditions of the member 1 of Example 6 are shown in Table 1, and the evaluation results thereof are shown in Table 2.

Example 7

The member 1 was produced through use of the same base material as that in Example 1.

A coating liquid for forming the first layer 3 was prepared by blending components having the following composition. 6.00 g of an IPA dispersion liquid (IPA-ST-UP manufactured by Nissan Chemical Industries, Ltd., average particle diameter: 12 nm, solid content concentration: 15 mass %) of chain-shaped silicon oxide particles was diluted with 22.13 g of 1-ethoxy-2-propanol to prepare a chain-shaped silicon oxide particle coating liquid (solid content concentration: 3.20 mass %).

In another container, a solution of 1.7 g of nitric acid water (concentration: 3.7 mass %) diluted in advance and 2.30 g of ethanol was slowly added to a solution of 4.17 g of ethyl silicate and 2.30 g of ethanol. The mixture was stirred at room temperature for 15 hours, and then 2.00 g of the weighed reaction solution was diluted with 36.33 g of 2-ethyl-1-butanol to prepare silica sol (solid content concentration: 0.6 mass %).

After the dispersion liquid was diluted with ethyl lactate so that the solid content concentration became 3.9 mass %, the silica sol was added to the resultant so that the ratio of the chain-shaped silicon oxide particles to the silica sol component became 100/6. Further, the resultant was mixed and stirred at room temperature for 2 hours to provide a coating liquid containing chain-shaped silicon oxide particles. The coating liquid containing chain-shaped silicon oxide particles was applied onto the base material by spin coating to form a porous layer having a thickness of 1.1 μm.

The pore volume in this case was 0.51 cm$^3$/g. After that, the same coating liquid containing a resin as that in Example 1 was applied under different spin coating conditions and cured to form a layer containing the resin.

The conditions of the member 1 of Example 7 are shown in Table 1, and the evaluation results thereof are shown in Table 2.

Example 8

The member 1 was produced through use of the same base material as that in Example 1.

A coating liquid for forming the first layer 3 was prepared by blending components having the following composition. While 1-ethoxy-2-propanol (hereinafter abbreviated as "1E2P") was added to 580 g of an isopropyl alcohol dispersion liquid of hollow silicon oxide particles (THRULYA 1110, manufactured by JGC Catalysts and Chemicals Ltd., average particle diameter: about 50 nm, shell thickness: about 10 nm, solid content concentration: 20.5 mass %), isopropyl alcohol was distilled off by heating. Isopropyl alcohol was distilled off until the solid content concentration became 19.5 mass %, to thereby prepare 610 g of a 1E2P solvent replacement liquid (hereinafter referred to as "solvent replacement liquid 1001") of hollow silicon oxide particles. A surface treatment agent was added to the obtained solvent replacement liquid 1001 so that the ratio of the hollow silicon oxide particles to the surface treatment agent (heptafluorobutyric acid, manufactured by Tokyo Chemical Industry Co., Ltd.) component became 100/1, to thereby provide a dispersion liquid 1002.

The dispersion liquid 1002 was diluted with ethyl lactate so that the solid content concentration became 3.9 mass %, and then silica sol was added to the resultant so that the ratio of the hollow silicon oxide particles to the silica sol component became 100/12. Further, the resultant was mixed and stirred at room temperature for 2 hours, to thereby provide a coating liquid 1007 containing hollow silicon oxide particles. A coating liquid containing chain-shaped silicon oxide particles was applied onto the base material by spin coating to form a porous layer having a thickness of 1.1 μm. The pore volume in this case was 0.22 cm$^3$/g. After that, the same coating liquid containing a resin as that in Example 1 was applied under different spin coating conditions and cured to form a layer containing the resin.

The conditions of the member 1 of Example 8 are shown in Table 1, and the evaluation results thereof are shown in Table 2.

Example 9

The member 1 was produced through use of the same coating liquid as that in Example 1. The film formation on a PET film was performed under the following conditions. A roll-shaped polyester film (Lumirror #188-U34, manufactured by Toray Industries, Inc.) having a width of 300 mm and a length of 200 M was used as a base material. In addition, the film formation was performed through use of a roll-to-roll coater (UVS-700, manufactured by Labo Co., Ltd.) as a film forming apparatus. A gravure system was used as a coating system under the condition that the film forming speed was 2.5 M/min.

First, a coating liquid 1005 was prepared in an apparatus pan, and the ratio between the film forming speed and the rotation speed of a micro gravure roll was adjusted so that the thickness of a porous layer to be obtained became 1 μm. The coating liquid was applied onto the base material, and the drying temperature was set to 80° C. After that, the same coating liquid containing a resin as that in Example 1 was formed by a gravure system.

The conditions of the member 1 of Example 9 are shown in Table 1, and the evaluation results thereof are shown in Table 2.

Example 10

The member 1 was produced through use of the same coating liquid as that in Example 1. A member was formed in the same manner as in Example 1 on the polished surface of a fused quartz substrate (φ30 mm, thickness: 1 mm, polished on one side) serving as a base material.

The conditions of the member 1 of Example 10 are shown in Table 1, and the evaluation results thereof are shown in Table 2.

Example 11

The member 1 was produced through use of the same coating liquid as that in Example 1. A member was produced in the same manner as in Example 1 on an SUS304 substrate (30 mm□, thickness: 1 mm) serving as a base material.

The conditions of the member 1 of Example 11 are shown in Table 1, and the evaluation results thereof are shown in Table 2.

Comparative Example 1

The member 1 was produced through use of the same base material as that in Example 1. After that, a member was produced in the same manner as in Example 1.

The conditions of the member 1 of Comparative Example 1 are shown in Table 1, and the evaluation results thereof are shown in Table 2.

Comparative Example 2

The member 1 was produced through use of the same base material as that in Example 1. The formation of the first layer 3 was performed in the same manner as in Example 1, and the rotation number of spin coating was appropriately adjusted so that the thickness of the porous layer became 0.3 μm. After that, a coating liquid containing a resin was applied in the same manner as in Example 1 and then cured to form a member.

The conditions of the member 1 of Comparative Example 2 are shown in Table 1, and the evaluation results thereof are shown in Table 2.

Comparative Example 3

The member 1 was produced through use of the same base material as that in Example 1. The film formation on the base material was performed by bar coating, and the conditions of the bar coating were adjusted so that the thickness of a porous layer to be obtained became 2.6 μm. After that, a coating liquid containing a resin was applied in the same manner as in Example 1 and then cured to form a member. As a result, cracks occurred on the surface of the member.

The conditions of the member 1 of Comparative Example 3 are shown in Table 1, and the evaluation results thereof are shown in Table 2.

Comparative Example 4

The member 1 was produced through use of the same base material as that in Example 1. A porous layer was formed in the same manner as in Example 1. After that, a coating liquid containing a resin was applied in the same manner as in Example 1 except that the spin coating conditions were adjusted so that the thickness of the third layer became 0.1 μm, and then cured to form a member.

The conditions of the member 1 of Comparative Example 4 are shown in Table 1, and the evaluation results thereof are shown in Table 2.

Comparative Example 5

The member 1 was produced through use of the same base material as that in Example 1. A porous layer was formed in the same manner as in Example 1. After that, a coating liquid containing a resin was applied in the same manner as in Comparative Example 3 except that the application by bar coating was repeatedly performed so that the thickness of the third layer became 3,000 μm, and then cured to form a member. The resultant member had film peeling between the base material and the first layer.

The conditions of the member 1 of Comparative Example 5 are shown in Table 1, and the evaluation results thereof are shown in Table 2.

Comparative Example 6

The member 1 was produced through use of the same base material as that in Example 1. The formation of the first layer 3 was performed in the same manner as in Example 1, and the rotation number of spin coating was appropriately adjusted so that the thickness of a porous layer to be obtained became 0.3 μm. After that, a coating liquid containing a resin was applied in the same manner as in Example 1 except that the spin coating conditions were changed, and then cured to form a member.

The conditions of the member 1 of Comparative Example 6 are shown in Table 1, and the evaluation results thereof are shown in Table 2.

Comparative Example 7

The member 1 was produced through use of the same base material as that in Example 1. The film formation on the base material was performed by bar coating, and the conditions of the bar coating were adjusted so that the thickness of a porous layer to be obtained became 2.6 μm. After that, a coating liquid containing a resin was applied in the same manner as in Comparative Example 4 and then cured to form a member. The resultant member had film peeling between the base material and the first layer. The conditions of the member 1 of Comparative Example 7 are shown in Table 1, and the evaluation results thereof are shown in Table 2.

TABLE 1

| | Base material | | | First layer | | | | Third layer | | |
|---|---|---|---|---|---|---|---|---|---|---|
| | Material | Thickness | Intermediate layer | Particle | Pore volume cm³/g | Thickness μm | Forming method | Material | Thickness μm | Forming method |
| Example 1 | Polycarbonate | 2 mm | Absent | Chain-shaped particle | 0.5 | 1 | Spin coating | Resin | 5 | Bar coating |
| Example 2 | Polycarbonate | 2 mm | Absent | Chain-shaped particle | 0.5 | 0.4 | Spin coating | Resin | 5 | Bar coating |
| Example 3 | Polycarbonate | 2 mm | Absent | Chain-shaped particle | 0.5 | 2 | Spin coating | Resin | 5 | Bar coating |
| Example 4 | Polycarbonate | 2 mm | Absent | Chain-shaped particle | 0.5 | 0.4 | Bar coating | Resin | 0.5 | Spin coating |
| Example 5 | Polycarbonate | 2 mm | Absent | Chain-shaped particle | 0.5 | 1 | Bar coating | Resin | 100 | Bar coating |
| Example 6 | Polycarbonate | 2 mm | Absent | Chain-shaped particle | 0.1 | 1 | Spin coating | Resin | 5 | Bar coating |
| Example 7 | Polycarbonate | 2 mm | Absent | Chain-shaped particle | 0.51 | 1 | Spin coating | Resin | 5 | Bar coating |
| Example 8 | Polycarbonate | 2 mm | Absent | Hollow particle | 0.22 | 1 | Spin coating | Resin | 5 | Bar coating |
| Example 9 | PET film | 2 mm | Absent | Chain-shaped particle | 0.5 | 1 | Roll-to-roll | Resin | 5 | Bar coating |
| Example 10 | Quartz | 2 mm | Absent | Chain-shaped particle | 0.5 | 1 | Spin coating | Resin | 5 | Bar coating |
| Example 11 | SUS plate | 1 mm | Absent | Chain-shaped particle | 0.5 | 1 | Spin coating | Resin | 5 | Bar coating |
| Comparative Example 1 | Polycarbonate | 2 mm | Absent | — | — | — | — | Resin | 5 | Bar coating |
| Comparative Example 2 | Polycarbonate | 2 mm | Absent | Chain-shaped particle | 0.5 | 0.2 | Spin coating | Resin | 5 | Bar coating |
| Comparative Example 3 | Polycarbonate | 2 mm | Absent | Chain-shaped particle | 0.5 | 2.5 | Bar coating | Resin | 5 | Bar coating |
| Comparative Example 4 | Polycarbonate | 2 mm | Absent | Chain-shaped particle | 0.5 | 1 | Bar coating | Resin | 0.1 | Spin coating |
| Comparative Example 5 | Polycarbonate | 2 mm | Absent | Chain-shaped particle | 0.5 | 1 | Bar coating | Resin | 3,000 | Bar coating |
| Comparative Example 6 | Polycarbonate | 2 mm | Absent | Chain-shaped particle | 0.5 | 0.2 | Spin coating | Resin | 0.1 | Bar coating |
| Comparative Example 7 | Polycarbonate | 2 mm | Absent | Chain-shaped particle | 0.5 | 2.5 | Spin coating | Resin | 3,000 | Bar coating |

TABLE 2

| | Evaluation results of member | | |
|---|---|---|---|
| | Impact resistance Judgment | Scratch resistance Judgment | Appearance |
| Example 1 | A | A | — |
| Example 2 | B | A | — |
| Example 3 | A | A | — |
| Example 4 | A | B | — |
| Example 5 | A | A | — |
| Example 6 | A | A | — |
| Example 7 | A | B | — |
| Example 8 | A | A | — |
| Example 9 | A | A | — |
| Example 10 | A | A | — |
| Example 11 | A | A | — |
| Comparative Example 1 | C | C | — |
| Comparative Example 2 | C | C | — |
| Comparative Example 3 | A | A | Film cracking |
| Comparative Example 4 | C | C | — |
| Comparative Example 5 | A | A | Film peeling |

TABLE 2-continued

|  | Evaluation results of member | | |
|---|---|---|---|
|  | Impact resistance Judgment | Scratch resistance Judgment | Appearance |
| Example 5 Comparative Example 6 | C | C | — |
| Comparative Example 7 | A | C | Film peeling |

From the results in Table 2, it was recognized that satisfactory impact resistance and scratch resistance as members for various applications can be achieved in Examples.

According to the present invention, a technology that is advantageous for improving impact resistance and scratch resistance of a member can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-183731, filed Nov. 10, 2021 which is hereby incorporated by reference herein in its entirety.

What is claimed is:

1. A member comprising a base material, a first layer, a second layer, and a third layer in the stated order,
   wherein the first layer is an inorganic porous layer in which a plurality of inorganic particles are joined to each other,
   wherein the third layer is a layer containing a resin,
   wherein the second layer is a layer containing the plurality of inorganic particles and the resin,
   wherein the first layer and the second layer have a total thickness of 0.3 μm to 2 μm,
   wherein the third layer has a thickness of 0.4 μm to 2,000 μm, and
   wherein the first layer has a pore volume of 0.1 $cm^3/g$ to 0.51 $cm^3/g$.

2. The member according to claim 1, wherein the first layer contains the plurality of inorganic particles in an amount of 50 vol % or more.

3. The member according to claim 1, wherein the plurality of inorganic particles each contain a metal oxide.

4. The member according to claim 3, wherein the plurality of inorganic particles each contain any one selected from the group consisting of: $SiO_2$; $Al_2O_3$; $TiO_2$; $ZnO_2$; and $ZrO_2$.

5. The member according to claim 1, wherein at least one of the plurality of inorganic particles is one of a solid particle, a chain-shaped particle, or a hollow particle.

6. The member according to claim 1, wherein the plurality of inorganic particles are joined to each other via an inorganic binder.

7. The member according to claim 6, wherein the inorganic binder is a silicon oxide binder.

8. A member comprising a base material, a first layer, a second layer, and a third layer in the stated order,
   wherein the first layer is an inorganic porous layer in which a plurality of inorganic particles are joined to each other,
   wherein the third layer is a layer containing a resin,
   wherein the second layer is a layer containing the plurality of inorganic particles and the resin,
   wherein the first layer and the second layer have a total thickness of 0.3 μm to 2 μm,
   wherein the third layer has a thickness of 0.4 μm to 2,000 μm, and
   wherein the second layer has a thickness of 0.1 μm to 1 μm.

9. The member according to claim 8, wherein the first layer has a pore volume of 0.1 $cm^3/g$ to 0.51 $cm^3/g$.

10. A member comprising a base material, a first layer, a second layer, and a third layer in the stated order,
    wherein the first layer is an inorganic porous layer in which a plurality of inorganic particles are joined to each other,
    wherein the third layer is a layer containing a resin,
    wherein the second layer is a layer containing the plurality of inorganic particles and the resin,
    wherein the first layer and the second layer have a total thickness of 0.3 μm to 2 μm,
    wherein the third layer has a thickness of 0.4 μm to 2,000 μm, and
    wherein the member further comprises a fifth layer between the base material and the first layer.

11. The member according to claim 10, wherein the fifth layer contains at least one selected from the group consisting of: zirconium oxide; titanium oxide; tantalum oxide; niobium oxide; hafnium oxide; silicon oxide; aluminum oxide; and a resin.

12. The member according to claim 1, wherein the third layer has any one function selected from the group consisting of: an antifouling property; hydrophilicity; an antibacterial property; an antiviral property; and decoration.

13. A method of producing the member according to claim 1, the method comprising:
    applying a coating liquid containing the plurality of inorganic particles and a solvent onto the base material to form a coating film;
    drying and/or calcining the base material having the coating film formed thereon to form a porous layer in which the plurality of inorganic particles are joined to each other; and
    applying a coating liquid containing the resin onto the porous layer to cause part of the resin to intrude into part of the porous layer, followed by curing.

14. A method of producing the member according to claim 9, the method comprising:
    applying a coating liquid containing the plurality of inorganic particles and a solvent onto the base material to form a coating film;
    drying and/or calcining the base material having the coating film formed thereon to form a porous layer in which the plurality of inorganic particles are joined to each other; and
    applying a coating liquid containing the resin onto the porous layer to cause part of the resin to intrude into part of the porous layer, followed by curing,
    wherein the porous layer has a pore volume of 0.1 $cm^3/g$ to 0.51 $cm^3/g$.

15. The method according to claim 13, wherein the plurality of inorganic particles each contain a metal oxide.

16. The method according to claim 13, wherein the plurality of inorganic particles each contain any one selected from the group consisting of: $SiO_2$; $Al_2O_3$; $TiO_2$; $ZnO_2$; and $ZrO_2$.

17. The method according to claim 13, wherein the coating liquid containing the plurality of inorganic particles and the solvent contains a component serving as a binder for joining the plurality of inorganic particles to each other.

18. The method according to claim 17, wherein the component serving as the binder is a silicon oxide compound.

* * * * *